United States Patent [19]

Masaki

[11] Patent Number: 4,716,511
[45] Date of Patent: Dec. 29, 1987

[54] SURGE CURRENT-LIMITING CIRCUIT

[75] Inventor: Kazumi Masaki, Osaka, Japan

[73] Assignee: Ken Hayashibara, Okayama, Japan

[21] Appl. No.: 874,017

[22] Filed: Jun. 12, 1986

[30] Foreign Application Priority Data

Jun. 28, 1985 [JP] Japan .................................. 60-140156

[51] Int. Cl.⁴ ......................... H02H 9/00; H05B 41/36
[52] U.S. Cl. ........................................ 363/49; 323/908;
361/58; 315/310
[58] Field of Search ............... 323/239, 242, 324, 326,
323/902, 908; 361/58, 29; 307/135; 315/310,
DIG. 5; 363/49

[56] References Cited

U.S. PATENT DOCUMENTS 3,555,361 12/1971 Hallberg ............................. 361/58
3,935,511 1/1976 Boulanger et al. .................. 361/58
4,396,882 8/1983 Kellenbenz ......................... 323/908
4,555,741 11/1985 Masaki ............................... 323/908

FOREIGN PATENT DOCUMENTS

WO84/04018 10/1984 PCT Int.'l Appl. .
1275613 5/1972 United Kingdom .
1315020 4/1973 United Kingdom .
2099241 12/1982 United Kingdom .
2113025 7/1983 United Kingdom .
2144001 2/1985 United Kingdom .
2144593 3/1985 United Kingdom .
2160723 12/1985 United Kingdom .
2170366 7/1986 United Kingdom .

Primary Examiner—Patrick R. Salce
Assistant Examiner—Judson H. Jones
Attorney, Agent, or Firm—Browdy and Neimark

[57] ABSTRACT

There is disclosed a surge current-limiting circuit including a current-limiting means connected in series with a load; a controlled rectifier connected in parallel with the current-limiting means; a photocoupler; and a delay circuit having a time constant, connected through the photocoupler with the gate of the controlled rectifier.

6 Claims, 4 Drawing Figures

SURGE CURRENT-LIMITING CIRCUIT

FIELD OF THE INVENTION

The present invention relates to an electric circuit for limiting a surge current, particularly, a surge current which may arise in incandescent lamp.

BACKGROUND OF THE INVENTION

It is known that motor and incandescent lamp receive a surge current several- to ten-odd-fold higher than their rating when coupled with an ac source. Specifically, the surge current across the lamp filament is one of the major factors that causes filament snapping. Various circuits have been proposed in order to limit the surge current.

For example, Japan Utility Model Kokai Nos. 117,672/74 and 12,269/78 propose circuits, wherein a resistor with a negative temperature coefficient such as thermistor is connected in series with an incandescent lamp in order to increase the load resistance that is initially coupled with an ac source. This circuit is convenient, but has the disadvantages that it is difficult to control the time interval to obtain a stationary operation of the incandescent lamp; and that the resistor consumes non-negligible amount of electricity by converting it to heat radiation, a relatively high current continuously flows through the resistor when in operation.

In Japan Patent Kokai Nos. 215,697/84 and 230,298/84, the present inventor proposed methods that overcome these disadvantages of the known circuits, wherein a surge current-limiting resistor, connected in series with an incandescent lamp, is short-circuited after a lamp filament reaches its stationary operation by connecting in series a current-sensing means such as diode or current transformer with the resistor; connecting in parallel a thyristor with the resistor; and applying through a delay circuit the voltage across the current-sensing means immediately after a power source is coupled. These methods are effective in limiting surge current, but still have the defect that the surge current-limiting circuits used in the methods consume a relatively high electricity because the current-sensing means is still connected in series with the main circuit even after the lamp filament reaches its stationary operation.

SUMMARY OF THE INVENTION

In view of the foregoing, one object of the present invention is to reduce the disadvantages of the known circuits.

Still another object of the present invention is to provide a surge current-limiting circuit that consumes less electricity during its operation.

These and other objects as may become apparent hereinafter have been attained by a circuit comprising a current-limiting means connected in series with a load; a controlled rectifier connected in parallel with the current-limiting means; a photocoupler; and a delay circuit having a time constant, connected through the photocoupler with the gate of the controlled rectifier.

DESCRIPTION OF THE PREFERRED EMBODIMENT

For a better understanding of the invention as well as other objects and further features thereof, preferred embodiments of the invention will be explained with reference to the accompanying drawings in which.

Throughout the accompanying drawings, symbol AC designates ac source; SW, switch; R, resistor; C, capacitor; J, voltage regulator diode; D, diode; LED, light emitting diode; CdS, cadmium resistor; PT, phototransistor; Z, load; PC, photocoupler; DC, delay circuit; TRIAC, bidirectional triode thyristor; and SCR, reverse-blocking triode thyristor.

Figure 1:
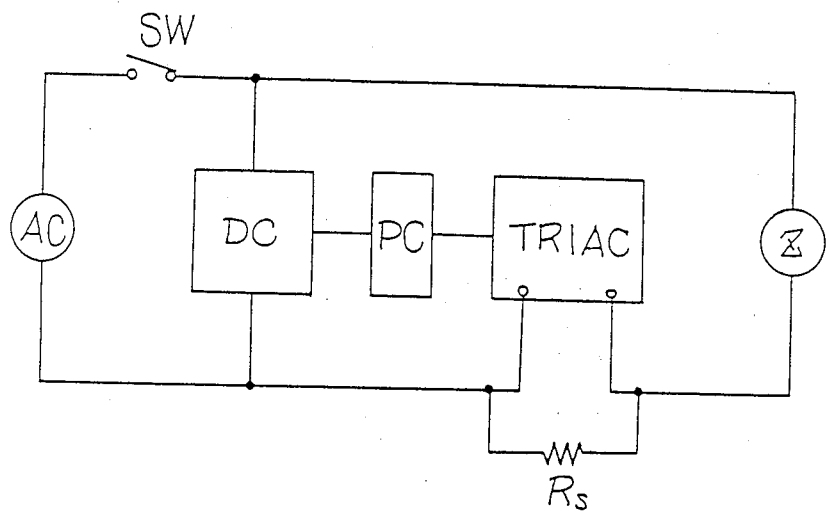
FIG. 1 is the basic circuit according to the invention.

FIG. 1 is the basic circuit according to the invention.

In the circuit, surge current-limiting resistor $R_s$ is connected in series with load Z such as an incandescent lamp, and a controlled rectifier such as bidirectional triode thyristor TRIAC is connected in parallel with surge current-limiting resistor $R_s$. The output of delay circuit DC that is separately actuated by ac source AC is connected through photocoupler PC with the gate of bidirectional triode thyristor TRIAC.

Examples of the photocoupler advantageously usable in the invention are those wherein a light emitting diode is combined with a photovoltaic cell such as solar cell that generates an electromotive force upon photoemission of the light emitting diode, and a phototransistor that amplifies the photo-current generated by photoemission of the light emitting diode.

The following explains the operation of the circuit as shown in FIG. 1.

When ac source AC is coupled with the circuit by closing power switch SW, an ac current flows through load Z and surge current-limiting resistor $R_s$ that is connected in series with load Z. Charge of delay circuit DC is initiated by closing ac source AC, and bidirectional triode thyristor TRIAC is triggered through photocoupler PC to short-circuit surge currentlimiting resistor $R_s$ instantly after the voltage across the delay circuit reaches a prescribed voltage level. Load Z is energized with its rated voltage simultaneously with the short-circuit of surge current-limiting resistor $R_s$.

The surge current which may arise at load Z is substantially limited by setting the time constant of delay circuit DC to warm up the lamp filament for about ½ to 2 seconds, preferably, about 1/10 to 1 second, and then short-circuiting surge current-limiting resistor $R_s$ to energize the lamp filament with its rated voltage.

Since the substantial resistance in the main circuit is only load Z when surge current-limiting resistor $R_s$ is short-circuited, the electricity consumed by the whole circuit is extremely reduced.

Figure 2:
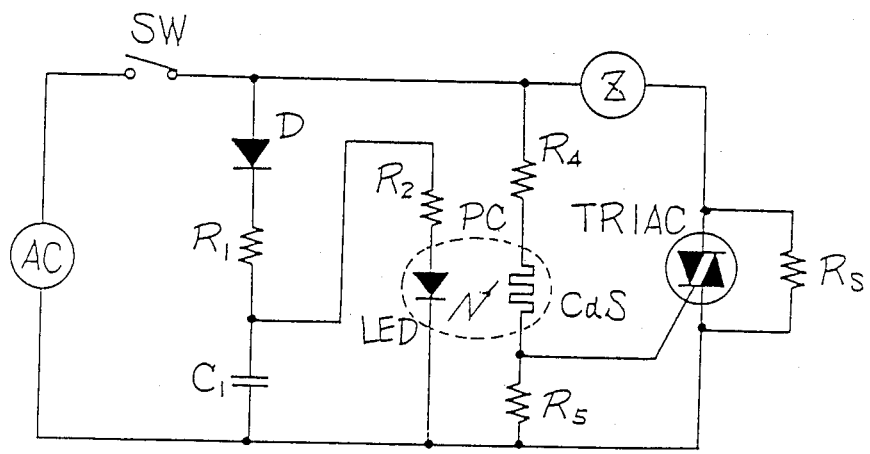
FIG. 2 is an embodiment wherein a cadmium resistor is used in the photocoupler.

The circuit as shown in FIG. 2 is an embodiment wherein photocoupler PC is composed of light emitting diode LED and cadmium resistor CdS.

In this circuit, closing of power switch SW flows an ac current through load Z and surge current-limiting resistor $R_s$ that is connected in series with load Z, and, simultaneously, the pulsatile current, produced by rectification with diode D, begins to charge capacitor $C_1$ through resistor $R_1$, both connected in delay circuit DC. When the time as determined by the time constant of delay circuit DC is over, capacitor $C_1$ discharges through resistor $R_2$ into photocoupler PC to actuate light emitting diode LED. The photoemission by light emitting diode LED decreases the resistance of cadmium resistor CdS, whereupon an ac current goes through resistor $R_4$ into the gate of bidirectional triode thyristor TRIAC, connected in parallel with surge current-limiting resistor $R_s$, to trigger bidirectional triode thyristor TRIAC, followed by short-circuit of surge current-limiting resistor $R_s$. In this way load Z is energized by its rated voltage.

Supposing that load Z is a 100 watt incandescent lamp, its filament resistance at ambient temperature will be about 8 ohms. Direct coupling of the filament with its rated ac voltage give rise to a surge current of about 12.5 amperes, which can be limited to about 0.92 amperes by connecting in series 100 ohm surge current-limiting resistor $R_s$ to load Z using the circuit according to the invention: that is, filament snapping caused by a initial surge current can be eliminated first by properly setting the time constant of resistor $R_1$ and capacitor $C_1$ used in the delay circuit to warm up the filament for about ½ to 2 seconds, preferably, ½ to 1 second, then triggering bidirectional triode thyristor TRIAC, connected in parallel with surge current-limiting resistor $R_s$, to energize load Z with its rated voltage.

Figure 3:
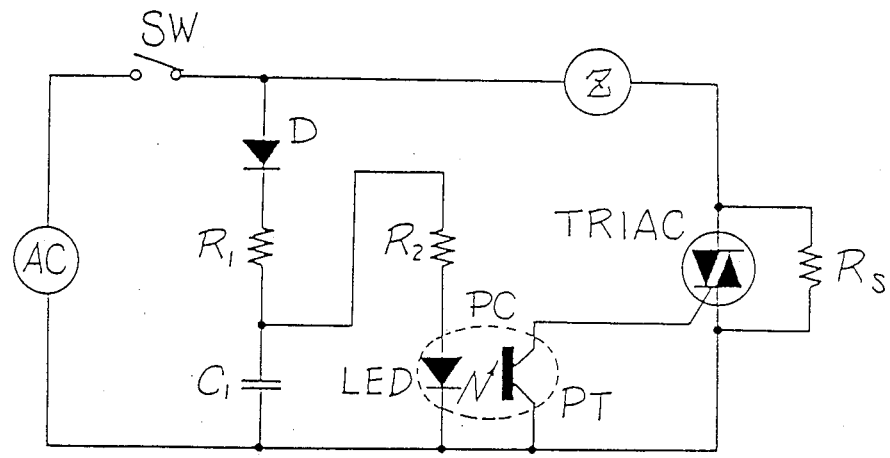
FIG. 3 is an embodiment wherein a phototransistor or a solar cell is used in the photocoupler.

The circuit as shown in FIG.3 is an embodiment wherein phototransistor PT that amplifies a photo-current generated by photoemission, or a solar cell having a photovoltaic effect is used in photocoupler PC in place of cadmium resistor CdS.

Figure 4:
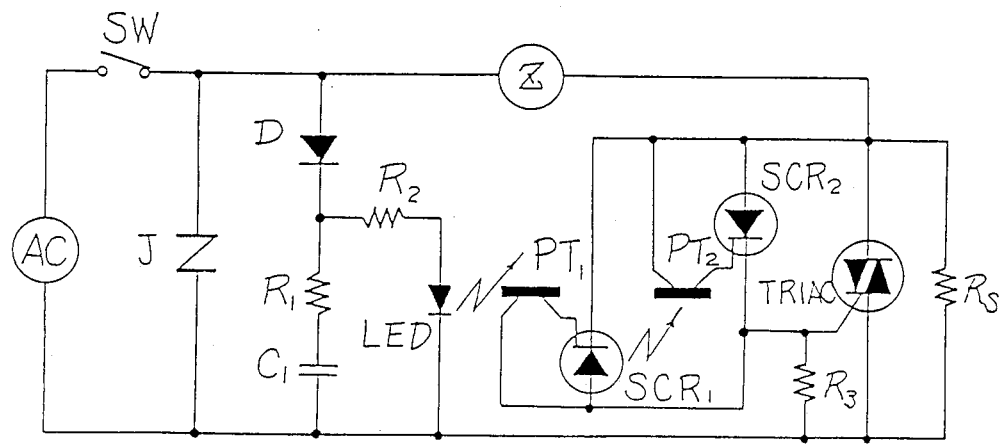
FIG. 4 is an embodiment wherein two pairs of one reverse-blocking triode thyristor and one phototransistor are used in combination.

FIG.4 is illustrative of a circuit wherein two reverse-blocking triode thyristors $SCR_1$ and $SCR_2$ and two phototransistor $PT_1$ and $PT_2$ are used in combination to actuate bidirectional triode thyristor TRIAC.

In this circuit, energization of positive half cycles triggers phototransistor $PT_2$, upon which surge current-limiting resistor $R_s$ is short-circuited by bidirectional triode thyristor TRIAC, while negative half cycles trigger phototransistor $PT_1$ and the voltage across resistor $R_3$ triggers bidirectional triode thyristor TRIAC to short-circuit surge current-limiting resistor $R_s$.

As described above, the present surge current-limiting circuit has the advantage that the surge current into incandescent lamp can be effectively limited with less electricity consumption because, unlike conventional circuit, neither a resistor having a negative temperature coefficient nor a currentsensing means is still connected in the main circuit after the incandescent lamp reaches its stationary operation.

As many apparently widely different embodiments of this invention may be made without departing from the spirit and scope thereof, it is to be understood that the invention is not limited to the specific embodiments thereof except as defined in the appended claims.

I claim:

1. A circuit for limiting surge current, consisting essentially of:
   (a) an AC power source connected in series with a switch;
   (b) a current-limiting means connected in series with a load and said AC power source and switch;
   (c) a control rectifier connected in parallel with the current-limiting means, said rectifier having a gate for its control;
   (d) a photocoupler connected with said gate of said controlled rectifier; and
   (e) a delay circuit having a time constant, connected in parallel with said AC power source and said switch, said delay circuit also being connected in parallel with said series circuit of said load and current-limiting means and further connected through the photocoupler with said gate of the controlled rectifier;
   wherein said current-limiting means is effectively short-circuited by said controlled rectifier being turned from the non-conducting state to the conducting state by said delay circuit via said photocoupler, after a period of time corresponding to said delay time after the closing of said switch, said photocoupler transmitting an amount of light which increases over said period corresponding to said time constant, for providing a respective gate signal to said gate of said controlled rectifier for said change of state thereof.

2. The circuit in accordance with claim 1, wherein said controlled rectifier is a bidirectional triode thyristor.

3. The circuit in accordance with claim 1, wherein said photocoupler is composed of a light emitting diode, and either a cadmium resistor or a solar cell.

4. The circuit in accordance with claim 1, wherein said load is an incandescent lamp.

5. The circuit in accordance with claim 1, wherein the time constant is set within the range of 1/20 to 2 seconds.

6. The circuit in accordance with claim 1, wherein said delay circuit is an RC-time constant circuit.

* * * * *